Feb. 25, 1964  G. H. HANNON  3,122,467
CHAIN OPERATED WORKING HEAD FOR MATERIAL CONVERTING MACHINERY
Filed Dec. 12, 1960  2 Sheets-Sheet 1

INVENTOR.
GILBERT H. HANNON
BY Warren F. B. Lindsey
ATTORNEY

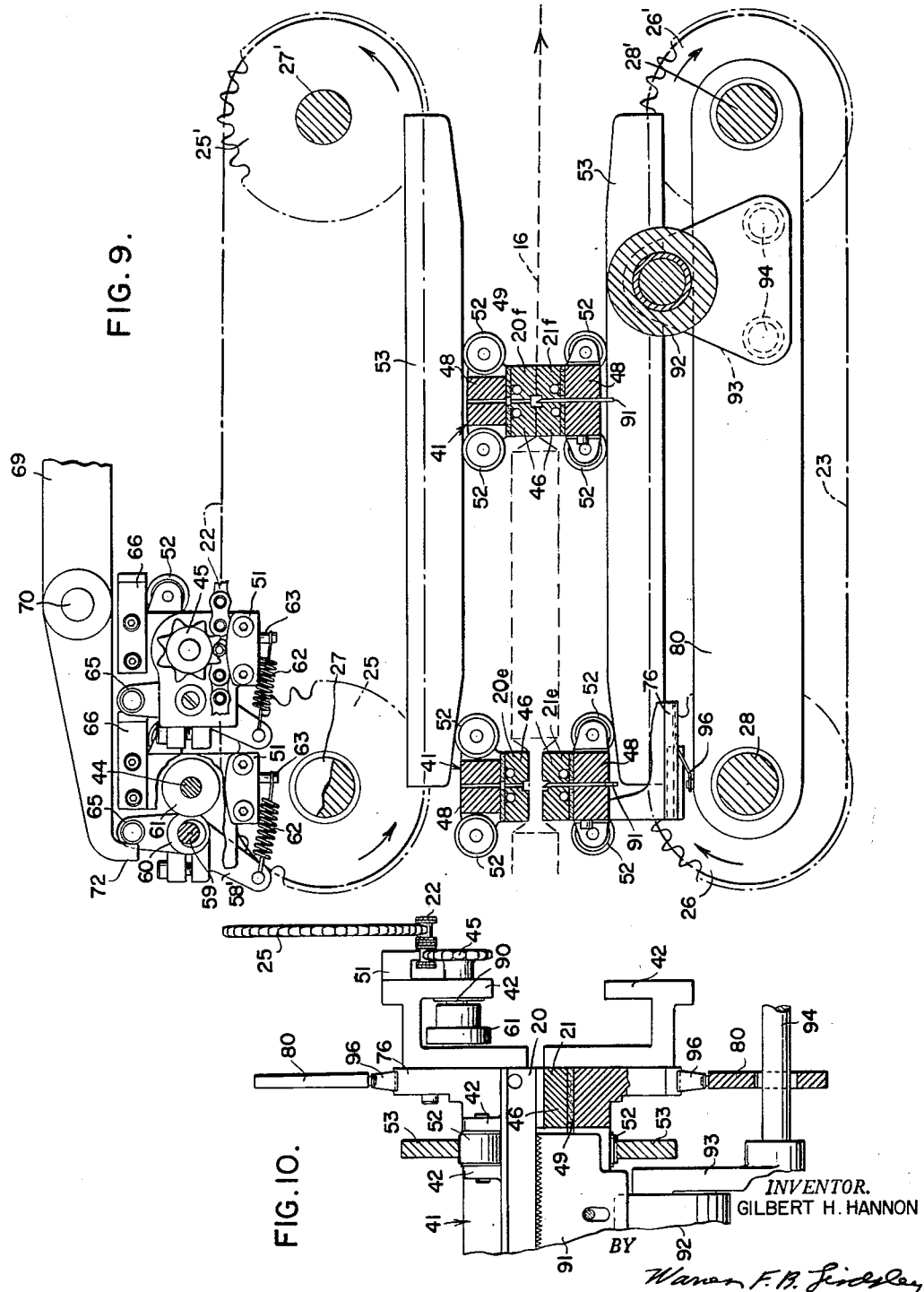

United States Patent Office 3,122,467
Patented Feb. 25, 1964

3,122,467
CHAIN OPERATED WORKING HEAD FOR
MATERIAL CONVERTING MACHINERY
Gilbert H. Hannon, Nicolet Road, Rte. 1, Green Bay, Wis.
Filed Dec. 12, 1960, Ser. No. 75,297
8 Claims. (Cl. 156—583)

This invention relates to a device for providing a plurality of sequential operations and more particularly to material converting machinery wherein a forming head provides a plurality of accurately controlled repetitive operations on a continuously moving strip of material.

In the field of packaging and bag manufacturing with paper, plastics, fiber and/or thermal sensitive or heat sealable materials, it has been known that pressure control of the forming members and contact time of the heat seal elements with the packaging and bag making material are directly related to the consistant quality of the seal, speed of operation and efficiency of the machine.

Constant velocity chain operated forming heads employing one or a plurality of relatively fixed forming members have been used, but this type of mechanism has been limited in performance because it can form only one length of finished product. To vary the length of the finished product, the forming members must be moved on the chain in given increments of chain pitch, or the chains must be replaced with other chains having a different arrangement of forming members. Variable velocity drives have been used with the chain operated forming heads employing relatively fixed forming members to obtain a variety of products of different lengths but these drives are complicated and expensive. Small product lengths are particularly difficult to obtain on this type of equipment because of the practical chain sprocket sizes.

In accordance with the invention claimed, a new and improved working head for performing a plurality of operations on a strip of moving material is provided. This device comprises in combination a base having at least one pair of endless tracks mounted thereon. One of the tracks is mounted on each side of the moving material. Means are provided for actuating the tracks. At least one movable cooperating working member is arranged to extend between and attachable to each of the tracks for movement therewith. Means are mounted along the tracks for holding the working member relatively stationary with respect to the movement of the tracks and further means are provided for causing the working member to interlock and move in unison with the tracks. Means are provided for actuating the holding means to release the working member to cause the interlocking means to lock the working member to the tracks for movement in unison therewith. During at least a part of the travel of the working member in unison with the tracks the member is caused to engage the strip to perform an action on the material.

It is, therefore, one object of the present invention to provide a new and improved device for providing a plurality of accurately controlled operations on a continuously moving strip of the material.

Another object of this invention is to provide a new and improved repetitive cycle operating device in which substantially an unlimited number of product sizes can be obtained.

A further object of this invention is to provide a new and improved forming head in which a plurality of stepless product sizes can be obtained.

A still further object of this invention is to provide a new and improved forming head in which relatively high or relatively low speed movements of the forming members can be readily obtained with constant or variable pressures applied thereto during a forming operation.

A still further object of this invention is to provide a new and improved chain operated sealing head in which the velocity of the cooperating sealing elements are substantially exactly matched to the movement of the material worked on and in which heat may be applied to each of the cooperating sealing elements.

A still further object of this invention is to provide a new and improved chain operated sealing head in which the sealing action occurs at any angle of the sealing elements with the moving material.

A still further object of this invention is to provide a new and improved chain operated sealing head which is adaptable for substantially any width sealing action on substantially any length repetitive cycle on substantially any form of packaging or heat sealable material.

A still further object of this invention is to provide a new and improved sealing head which can perform a combination of operations on a strip of material such as sealing and cutting off of the bag or packaging material.

A still further object of this invention is to provide a repetitive cycle operating device which is simple, durable and economical in construction and operation.

Other objects and advantages of this invention will become apparent from the following description when read in connection with the accompanying drawings, in which.

Figure 1:
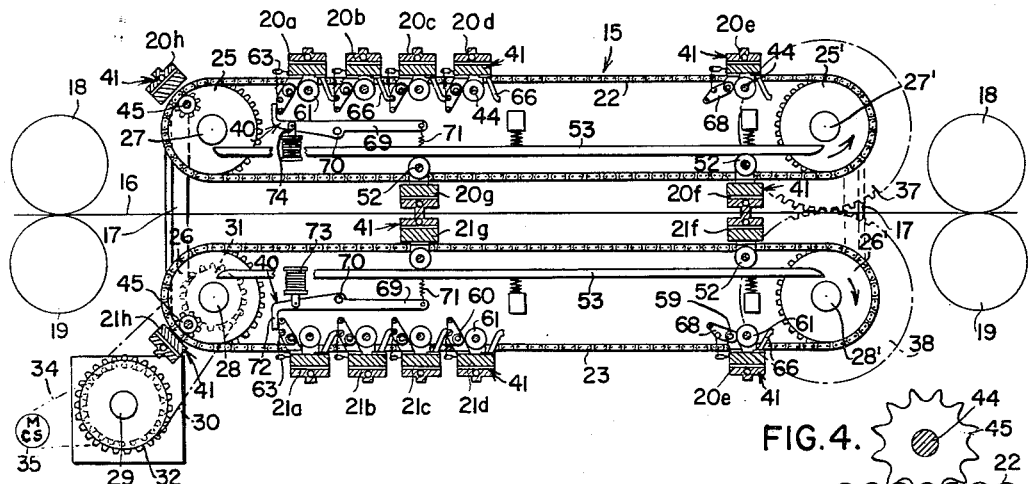
FIG. 1 is a diagrammatical illustration of a side view of the repetitive cycle device embodying the various features of the present invention.
Figures 5, 6, 7, 8:
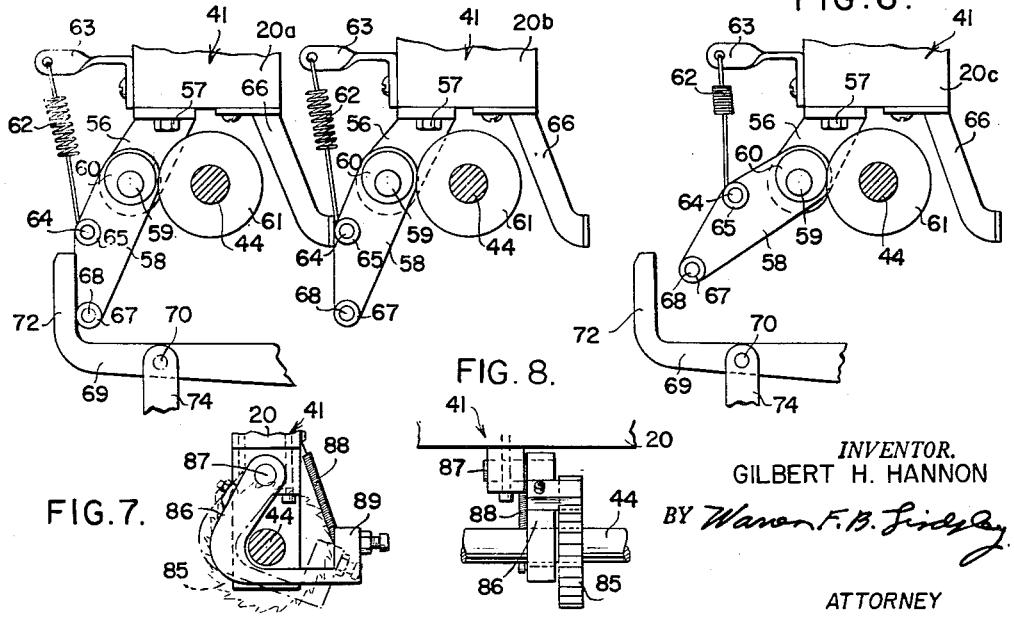
FIG. 5 is an enlarged partial view of the sealing elements shown in FIG. 1 in the free wheeling position relative to the chain drive.
FIG. 6 is an enlarged partial view of the sealing elements shown in FIG. 1 in the chain drive attached position.
FIG. 7 is a partial view of a modification of the free wheeling and chain drive attachment means shown in FIGS. 1–6.

FIG. 8 s an end view of the structure shown in FIG. 7;

FIG. 9 is an enlarged partial view of a further modification of the chain driven sealing head mechanism shown in FIG. 1 using one forming knife element for engaging a cooperating pressure resistant element and showing a plurality of forming elements in various positions along the chain drive; and FIG. 10 is an enlarged view partially in cross section of the cooperating and engaging cutting element shown in FIG. 9.

Referring more particularly to the drawings by characters of reference FIGS. 1–6 illustrate a repetitive cycle operating device 15 which is illustrated in operative arrangement with a continuous moving strip of material 16. In the description following, the invention is described with relation to a sealing head operating on a pair of superimposed strips of pliable plastic material such as transparent plastic wrap to form sequentially a plurality of bags, but it is to be understood that this new and improved forming head may be employed to produce any form of machine action on a continuously moving strip of any type of material, such as for example, paper, plastics, fiber, rubber, metal strips or any form of thermal sensitive or heat sealable materials as the case may be. This invention and the structures disclosed employing its novel features may be used on an unlimited variety of machinery including paper converting machinery such as automatic wrappers, bag or pouch making machines and paper sheeters.

The repetitive cycle operating device 15 is mounted on a base 17 over or through which the strip or superimposed strips of material 16 may pass. Strip 16 may be fed to the forming head or operating device 15 in any suitable manner such as in the form of flat or gusseted bags empty or around a product (not shown). It is understood that in bag fabrication the web 16 can be either formed and back seamed into flat or gusseted tubing or can be extruded tubing flat or gusseted without back seaming. In FIG. 1 it will be seen that web or strip 16 is fed through two pairs of driving rollers 18 and 19. Rollers 18 and 19 if used not only flatten the strip 16 but also keep it taut over that portion of it subject to the operation of device 15. If a filled bag is fed to the working members shown rollers 18 and 19 may be omitted or may be arranged to grip the material without damaging the packaged product. Device 15 when mounted on a machine structure usually provides a predetermined path over which strip 16 passes and the forming operation of device 15 may occur at any point along said path.

Device 15 shown in FIGS. 1–6 may comprise, for example, one or a plurality of pairs of cooperating relatively movable sealing heads or members 20a through 20h and 21a through 21h. These sealing heads or members are movable toward or away from the surface of strip 16. During a part of the movable cycle of members 20a through 20h and 21a through 21h they are actuated toward each other in unison to cooperatively engage with strip 16 therebetween to perform an operation thereon. During the period of movement individually and with each other and strip 16, these members are actuated at the same speed as strip 16.

As shown in FIGS. 1–6 sealing members 20a through 20h and 21a through 21h are actuated by two pairs of endless tracks such as belts, cables or chains 22 and 23. For purposes of illustration the tracks are shown as double roller chains which are mounted on opposite sides of the path of movement of the packaging material through device 15. Each of the chains of each pair of chains is carried by a pair of sprockets 25, 25' and 26, 26'. Sprockets 25, 25' and 26, 26' are fixedly secured to shafts 27, 27' and 28, 28' which are rotatably mounted in bearing structures (not shown) formed in the frame structure of device 15 mounted on base 17. Shaft 28, 28' of the lower chains 23, as shown in FIG. 1, are driven by drive shaft 29 through a pair of spaced endless belt or chain drives 30, well known in the art (one of which is shown in FIG. 1). The endless chain drive 30 is actuated through sprocket 32 mounted on shaft 29. Drive shaft 29 is actuated through an endless belt or chain 34 from any suitable source of power, for example, a constant speed drive such as electric motor 35 shown symbolically.

In order to cause chains 22 and 23 driving the sealing members to operate in unison, gears 37 and 38 mounted on shafts 27' and 28' are arranged in meshing engagement. Thus, as the lower pair of chains 23 are actuated by motor 35 their movement is conveyed through gears 37 and 38 to the upper pair of chains 22. Chains 22 and 23 are driven at a velocity equal to the velocity of web or strip 16.

Members 20a through 20h and 21a through 21h are shown herein as temperature controlled sealing heads and their description will be covered in detail herein but it is to be understood that any other type of working or forming head may be readily attached to device 15 to cause the desired cooperating action to perform a useful function.

Sealing members 20a through 20d and 21a through 21d are shown in FIG. 1 in a collected free wheeling position awaiting release by a lever means 40, and sealing members 20e through 20h and 21e through 21h are shown interlocked to double roller chains 22 and 23, respectively, and moving in unison therewith.

Figures 2, 3, 4:
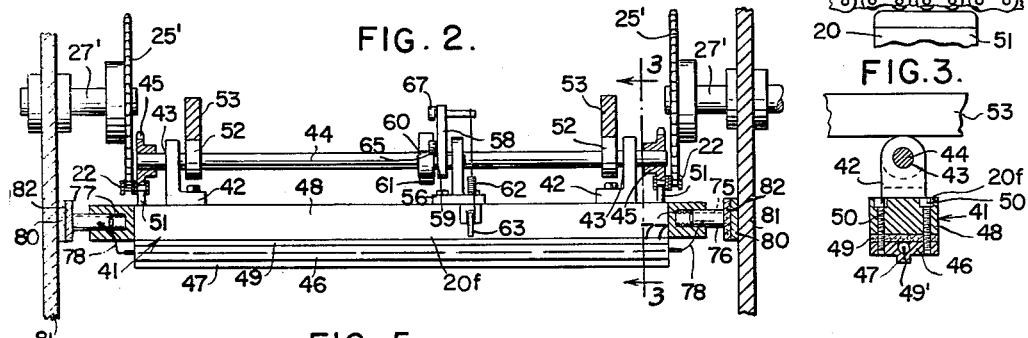
FIG. 2 is a partial sectional view of one of the sealing elements shown in FIG. 1.
FIG. 3 is a partial cross sectional view of the sealing element shown in FIG. 2 taken along the lines 3—3.
FIG. 4 is a partial end view of the sealing bar shaft mechanism shown in FIG. 2.

FIG. 2 illustrates an end view of sealing member 20f shown in FIG. 1. The other sealing members in FIG. 1 are of identical construction. The double roller chains are driven by drive sprockets 26 and 25' on drive shafts 28 and 27', respectively. Idle sprockets 26' and 25 are mounted on idle shafts 28' and 27. The sealing members shown in FIGS. 1–3 each comprise a base member 41 provided with two brackets 42 extending outwardly therefrom on the same side thereof. Each bracket provides a bearing 43 extending through the brackets in a direction substantially parallel to the longitudinal axis of base member 41 for a shaft 44. Shaft 44 is provided with sprockets 45 fixedly attached at each end thereof for engaging the links of the inner chains of the pair of double chains 22. The sprockets 25' mounted on shafts 27' which are rotatably mounted in bearings in the frame of device 15 engage the links of the outer chain of the double chains 22. As evident from FIG. 2 of the drawing unless means are provided for causing shaft 44 to become relatively fixed in its bearings 43, sprockets 45 will rotate upon movement of chain 22 in a free wheeling manner.

FIG. 3 illustrates a cross sectional view of the sealing member shown in FIG. 2 and the force transmitting member in contact therewith. The base member 41 of sealing member 20f comprises a grooved retainer 46 having a ridge or limited surface area 47. Retainer 46 is attached to a backing bar 48. An insulator 49 is sandwiched between retainer 46 and backing bar 48 to provide the desired thermal insulation. A thermal element such as a high temperature, high resistance rod 49' is inserted in the groove of retainer 46. All parts of the sealing head are held together by bolts 50 threaded through aligned apertures in retainer 46, insulator 49 and backing bar 48 to form a unitary structure.

FIG. 4 illustrates one means of assuring engagement and horizontal and lateral stability of the sealing members 20. As noted from the drawings sprocket 45 engages roller chain 22 on one side and bearing bars 51 mounted on members 20 on each end thereof engage the rollers of roller chains 22 on the other side. Bearing bars 51 not only assure engagement of sprocket 45 with chains 22 but also provides horizontal and vertical stability of the sealing members 20 when a pressure bearing 52 engages a pressure plate 53. Pressure plates 53 are shown in FIGS. 1 and 2 and are resiliently mounted on device 15 so as to bear against the pressure bearings 52 mounted around the ends of shaft 44 adjacent the outer brackets 42. It is understood by one skilled in the art that other forms of stabilizing means may be applied to chains 22 and 23 or sealing members 20 if so desired.

FIGS. 2, 5 and 6 illustrate the means for rendering the sealing members 20 free wheeling with respect to chains 22 and 23 or for interlocking therewith to move in unison with the chain drives. This means comprises a bracket 56 suitably secured such as by bolts 57 to base member 41 of the sealing member 20. To bracket 56 is pivotally mounted arm 58 by means of a pivot pin 59. An eccentric 60 is secured to pin 59 and forms a locking means to lock shaft 44 to chains 22 and 23. A hardened roller 61 is secured to shaft 44 for engagement with eccentric 60 upon predetermined rotation of arm 58. A spring 62 is arranged to extend between a bracket 63 mounted on base member 41 and a pin 64 mounted on arm 58. Pin 64 is provided with a roller 65 for engaging a latching arm 66 mounted on base member 41 of a following sealing member as shown in FIG. 5. At the lower end of arm 58 as shown in FIGS. 5 and 6 is mounted a second roller 67 on a pin 68 for engaging the movable solenoid actuated latching arm 69. Spring 62 and bracket 63 are provided to urge arm 58 in an upward direction as shown in FIG. 6.

FIG. 6 illustrates the locking action of eccentric 60 when no obstruction is presented to the path of travel of roller 65. In this figure of the drawing it is noted that as eccentric 60 is rotated upon rotation of arm 58 by spring 62 the eccentric is caused to engage roller 61 on shaft 44. This braking or friction action applies a load to shaft 44 and locks shaft 44 and sprockets 43 to the chain drive associated therewith, and the sealing member then travels in unison with the associated chain.

As shown more clearly in FIG. 1 the latching arm 69 is pivotally mounted on the frame of device 15 at a point 70 and is biased clockwise by a spring 71 extending between one end of arm 69 and the frame of device 15. The other end of arm 69 is provided with a protrusion 72 for engaging rollers 67 on arm 58 when arm 69 is in a given position. Arm 69 may be rotated counterclockwise against the action of spring 71 by means of a solenoid 73 which has its armature 74 pivotally mounted to arm 68 near its protrusion 72. Although solenoid 73 has been shown for actuating arm 69, it is to be understood that air of hydraulic operated cylinders, star wheels, cams, or any of a variety of such mechanisms may be used in place thereof.

In FIG. 5 it is noted that latching arm 69 through engagement with roller 68 on arm 58 has pivoted arm 58 downward and counterclockwise a predetermined amount. Rotation of arm 58 counterclockwise has resulted in rotation of pin 59 and eccentric 60. This action causes disengagement of eccentric 60 with roller 61 on shaft 44. It is obvious then that although sprockets 45 (FIGS. 2 and 4) are still engaged with moving chains 22 or 23 and consequently shaft 44 is still rotating, sealing elements such as 20a through 20d and 21a through 21d shown in FIG. 2 remain in a stopped position, i.e., they are in a free wheeling arrangement. As further noted from FIG. 5 the upper roller 65 of arm 58 of sealing member 20a has engaged arm 58 of sealing member 20b. This engagement also causes counterclockwise rotation of arm 58 of sealing member 20b which in turn causes shaft 44 of sealing member 20b to freely rotate in a free wheeling arrangement. In a similar manner a plurality of sealing members as presented by sealing members 20a through 20d and 21a through 21d may be gathered or grouped together.

Solenoids 73 or similar mechanisms may be operated to sequentially release pairs of sealing members in various manners. One example would be to provide a photoelectric cell (not shown but well known in the art) to be triggered by a printed mark on the product or tube within which the product is wrapped. Another example would be to trigger the solenoid by a cam and microswitch arrangement which would be actuated upon predetermined movement of a web or strip of packaging material. When solenoid 73 or a similar mechanism is actuated, latching arm 69 is rotated counterclockwise as shown in FIG. 1 to cause the protrusion 72 on latching arm 69 to clear roller 68 on arm 58. Spring 56 then rotates arm 58 clockwise and eccentric 60 engages roller 61. This immediately prevents rotation of shaft 44 with respect to the sealing member such as member 20a, and member 20a is then effectively locked to chain 22 and must move therewith until arm 58 is again rotated counterclockwise to release eccentric 60 from roller 61. Solenoid 73 is energized for only a very short duration of time and spring 71 on latching arm 69 returns arm 69 to its upward position in time to prevent the release of more than one sealing member at a time.

In operation, upon the energization of solenoids 73 the latching arm 69 of the upper portion of FIG. 1 is rotated counterclockwise and the lower latching arm 69 is rotated clockwise to release sealing members 20a and 21a, respectively. These sealing members travel in unison with chains 22 and 23, respectively, and engage the material 16 therebetween to perform their sealing action. Sealing members 20a and 21a stay together in cooperating engagement until they are separated by sprockets 25' and 26' at which time they continue their travel until they are rendered free wheeling by engagement of their rollers 65 with arm 66 of the preceding sealing member in the manner described.

The sealing members are heated by the application of electric current to their heating elements 49'. Each sealing element is provided with a carbon brush 75 mounted in an insulating sleeve 76 in the ends of base members 41 and urged outwardly therefrom by a spring 77. These brushes are in electrical contact with the heating elements 49' through suitable wires 78. An elongated track 80 of conductive material such as brass is attached to the side frames 81 of device 15 but insulated from the frames by suitable material 82. Thus, it is obvious that electrical power can be supplied continuously or intermittently to one end of heating element 49'. A duplicate arrangement on the opposite end of the sealing member is used to complete the circuit. Although heating element 49' is shown as a thermal resistance unit, element 49' can consist of a high resistance wire mounted on the sealing face of sealing member 20. By interrupting the continuity of track 80, intermittent power can be applied to the high resistance wire for sealing in a manner commonly referred to as "impulse sealing." It is understood, however, that other means of conducting electric power to element 49' may be utilized.

FIGS. 7 and 8 illustrate a modification of the eccentric 60 and roller 61 friction locking arrangement of FIGS. 1-6 wherein a ratchet 85 and pawl 86 are provided for positively locking the sealing members 20 to chains 22 and 23. Ratchet 85 is fixedly mounted on shaft 44 for rotation therewith while pawl 86 is pivotally mounted on base member 41 of the sealing members 20 at point 87 and at least partially surrounds shaft 44. Pawl 86 is biased into engagement with ratchet 85 by a spring 88 arranged between base member 41 and the free end 89 of the pawl. In order to release the ratchet to render sealing members 20 free wheeling the free end 89 of pawl 86 is connected to the latching arm 69 for actuation by solenoid 73 or directly connected to solenoid 73 for actuation thereof.

FIGS. 9 and 10 illustrate a further modification of the structures shown in FIGS. 1-8 wherein shaft 44 which extends completely across the sealing member is replaced by two coaxially aligned shaft portions 90 (one of which is shown in FIGS. 9 and 10). As in FIG. 2 both ends of the working members of FIGS. 9 and 10 are identical so only one end of these members is shown. The shaft portions 90 have mounted thereon sprockets 45 and the associated pressure bearings 52 and pressure plates 53. The working members have a slightly different construction in that the base member is split for receiving a knife blade 91 carried by its cooperating sealing member. The blade 91 carried, for example, by forming heads 21 is mounted for vertical reciprocal movement. A free wheeling roller 92 rotatably mounted on frame 81 by a pair of spaced brackets 93 attached to a shaft 94 supports the roller in line of movement of blade 91. As the working members 20f and 21f moving in engagement with each other passed roller 92, roller 92 engages the lower end of blade 91 (as shown in FIG. 9) and forces the blade upward and through the package or package material and into a suitable groove formed in surface 46 of the cooperating forming member, thereby forming the desired cutting action. After performing the cutting action and the working members 20f and 21f move beyond roller 92, the knife blade 91 returns to its lowermost position by gravity or some other suitable means such as a cam or spring biasing arrangement, well known in the art.

The working members are locked to chains 22 and 23 or are rendered free wheeling in the same general manner as explained in FIGS. 1-6 except that bracket 56 and arm 58 of FIGS. 1-6 are replaced by a single piece 58'. The eccentric 60 mounted on shaft 59 is rotated into engagement with roller 61 upon rotation of arm 58 when released by latching arm 69 and when acted upon by the biasing effect of spring 62.

The electrical energization of any sealing member associated with the structure of FIGS. 9 and 10 may be obtained by a spring contact 96 riding on track 80 in the manner explained for the structure in FIGS. 1–6.

Although in the figures of the drawing two cooperating working members have been shown it is readily understood that only one pair of moving tracks may be used employing thereon one or a group of forming members which members provide their forming action by moving against from one side only the packaging material or the packaging material supported on a suitable conveyor. FIGS. 1 and 9 clearly illustrate this type of operation when the lower chain drive 23 and its forming members are disregarded and for this reason this modification is not separately shown.

Although but a few embodiments of the present invention have been described it will be apparent to those skilled in the art that various changes and modifications may be made therein without departing from the spirit of the invention or from the scope of the appended claims.

What is claimed is:

1. A forming head for cyclic operations along a predetermined path comprising a base, two pairs of endless tracks mounted on said base, one of said pairs of tracks being mounted on each side of said path, means for actuating said tracks in unison, a plurality of pairs of cooperating forming members, one of each of said pairs of members extending between and being attachable to each of said pairs of tracks for periodic movement therewith, means mounted along each of said tracks for engaging with and collectively gathering said members at a given point along said tracks, latch means mounted on each of said members for interlocking with and sequentially rendering said members free wheeling with respect to the movement of said tracks, said engaging and gathering means actuating said latch means to render said members free wheeling, means for actuating said engaging and gathering means to sequentially release pairs of said members, said members upon release of said engaging and gathering means interlocking with said tracks to move in unison therewith, and means mounted between said pairs of tracks for causing said members to engage each other during at least a part of their travel with said tracks to perform a forming action.

2. A device for performing an operation on a strip of moving material comprising in combination a base, means for moving the material along a predetermined path over said base, two pairs of endless tracks mounted on said base, one of said pairs of tracks being mounted on each side of said material, means for actuating said tracks at substantially the same speed as said material, a plurality of pairs of cooperating sealing members, means for mounting one of each of said pairs of members between and to each of said pairs of tracks for periodic movement therewith, lever means mounted along each of said tracks for engaging with and collectively gathering said members at a given point along said tracks, latching means mounted on each of said members for engaging said mounting means to render it ineffective and for sequentially rendering said members free wheeling with respect to the movement of said tracks, said lever means upon engaging and gathering said members actuating said latching means to render said members free wheeling, solenoid means for actuating said lever means upon energization thereof to sequentially release one pair of said members, said latching means upon release of said members by said lever means interlocking with said tracks to move in unison therewith, means for heating at least one of said members during at least a part of the time said members move in unison with said tracks, and means mounted between said pairs of tracks for causing said members to engage each other during at least a part of their travel with said tracks to perform a sealing action.

3. A forming head for cycle operations on a strip of moving material comprising a base, means for moving the material along a predetermined path over said base, a pair of endless tracks mounted on said base, means for actuating said tracks in unison, a plurality of forming members, rotatable sprocket means mounted on said members for engaging said tracks in a free wheeling arrangement, latching means mounted on each of said members and biased for engaging said sprocket means to interlock said members to said tracks to move in unison therewith, means mounted on said base for engaging said latching means for causing said latching means to disengage from said sprocket means to render said members free wheeling upon said members reaching a predetermined point in its cycle of operation, said latching means mounted on each of said members rendering it free wheeling upon engagement with a preceding member, and means for causing said members to engage said material while moving in unison with said tracks at a predetermined point on said base to perform a cooperating forming action thereon.

4. A forming head for cyclic operations on a strip of moving material comprising a base, means for moving the material along a predetermined path over said base, a pair of endless tracks mounted on said base, means for actuating said tracks in unison, a plurality of forming members, each of said members extending between said pair of tracks, sprocket means mounted on each of said members for engaging said tracks in a free wheeling arrangement, cam means mounted on each of said members and biased for engaging said sprocket means for causing said sprocket means to interlock with said tracks to move said members in unison with said tracks, means mounted on said base for engaging said cam means of at least one of said members for causing said cam means to disengage from said sprocket means thereby rendering said one of said members free wheeling upon said one of said members reaching a predetermined point in its cycle of operation, means mounted on each of said members for engaging said cam means for rendering said sprocket means attached to said members free wheeling upon engagement of one of said members with a proceeding member, and means for causing said members to engage said material while moving in unison with said tracks at a predetermined point on said base to perform a cooperating forming action thereon.

5. A forming head for operation along a predetermined path comprising a base, two pairs of endless tracks mounted on said base, one of said pairs of tracks being mounted on each side of said path, means for actuating said tracks, a plurality of pairs of relatively movable cooperating forming members, one of said members of each of said pairs extending between and being attachable to each of said pairs of tracks for periodic movement therewith, means mounted on each of said members for rendering said members free wheeling with respect to said tracks, cam means mounted on each of said members and biased for engaging said free wheeling means to render it ineffective thereby interlocking said members to said tracks to cause said members to move in unison with said tracks, means mounted at a predetermined point along each of said tracks for engaging said cam means for rendering at least one of said members free wheeling with respect to the movement of said tracks, said cam means mounted on each of said members rendering said members free wheeling upon engagement with a preceding member, and means mounted between said pairs of tracks for causing said members to engage each other during at least a part of their travel in unison with said tracks to perform a sealing action thereon.

6. A device for performing an operation on a strip of moving material comprising in combination a base, means for moving the material along a predetermined path over said base, two pairs of endless tracks mounted on said base, one of said pairs of tracks being mounted on each side of said material, means for actuating said tracks in unison with said material, a plurality of pairs of cooperating sealing members, one of said pairs of members extending between each of said pairs of tracks, sprocket means mounted one on each of said members for engaging said tracks for periodic movement therewith, means mounted on each of said members for rendering said members free wheeling with respect to said tracks, cam means mounted on each of said members for engaging and actuating said latter means for rendering said members free wheeling, lever means mounted along each of said tracks for engaging with and collectively gathering said members at a given point along said tracks, said lever means upon engaging said members actuating said cam means to render said members free wheeling, means for actuating said lever means to sequentially release pairs of said members, said sprocket means upon release of said members by said lever means interlocking with said tracks to move in unison therewith, and means mounted between said pairs of tracks for causing said members to engage each other during at least a part of their travel with said tracks to perform a sealing action.

7. A device for performing an operation on a strip of moving material comprising in combination a base, means for moving the material along a predetermined path over said base, two pairs of endless tracks mounted on said base, one of said pairs of tracks being mounted on each side of said material, means for actuating said tracks at substantially the same speed as said material, a plurality of pairs of cooperating sealing members arranged to extend between said tracks, sprocket means mounted one on each of said pairs of members for engaging said tracks for periodic movement therewith, lever means mounted along each of said tracks for engaging with and collectively gathering said members at a given point along said tracks, cam means mounted on each of said members for engaging said sprocket means to render said sprocket means free wheeling with respect to the movement of said tracks, said lever means upon engaging and gathering said members actuating said cam means to render said members free wheeling, means for actuating said lever means upon energization thereof to sequentially release one pair of said members, said sprocket means upon release of said members by said lever means interlocking with said tracks to move in unison therewith, means for heating both of said released members intermittently during at least a part of the time said members move in unison with said tracks, and means mounted between said pairs of tracks for causing said members to engage each other during at least a part of their travel with said tracks to perform a sealing action.

8. A device for performing an operation on a strip of moving material comprising in combination a base, means for moving the material along a predetermined path over said base, two pairs of endless double link chain tracks mounted on said base, one of said pair of tracks being mounted on each side of said material, means for engaging the links of one of each of said double link chain tracks for actuating said tracks in unison with said material, a plurality of pairs of cooperating sealing members arranged to extend between said tracks, sprocket means mounted one on each of said pairs of members for engaging the other row of links of each of said pair for tracks for periodic movement therewith, lever means mounted along each of said tracks for engaging with and collectively gathering said members at a given point along said tracks, cam means mounted on each of said members for engaging said sprocket means to render said sprocket means free wheeling with respect to the movement of said other row of links of said tracks, solenoid means for actuating said lever means to sequentially release pairs of said members, said cam means upon release of said members by said solenoid means causing said sprocket means to interlock with said tracks to move in unison therewith, and means mounted between said pair of tracks for causing said members to engage each other during at least a part of their travel with said tracks to perform a sealing action.

References Cited in the file of this patent

UNITED STATES PATENTS

| 2,106,740 | Hepke | Feb. 1, 1938 |
| 2,984,288 | Gaubert | May 16, 1961 |